United States Patent [19]
Tanabe

[11] Patent Number: 5,508,772
[45] Date of Patent: Apr. 16, 1996

[54] ELECTROMAGNETIC DEVICE FOR A CAMERA

[75] Inventor: Yoshiaki Tanabe, Yokohama, Japan

[73] Assignee: Nikon Corporation, Tokyo, Japan

[21] Appl. No.: 201,986

[22] Filed: Feb. 25, 1994

[30] Foreign Application Priority Data

Mar. 12, 1993 [JP] Japan .................................. 5-010783

[51] Int. Cl.⁶ .............................. G03B 9/08; G03B 9/02; H01F 7/08
[52] U.S. Cl. .................. 354/234.1; 354/152; 354/271.1; 335/271; 335/277
[58] Field of Search .................................. 335/270, 271, 335/275, 276, 277; 354/234.1, 235.1, 271.1, 152

[56] References Cited

U.S. PATENT DOCUMENTS

| | | | |
|---|---|---|---|
| 3,664,251 | 5/1972 | Vincent | 335/271 |
| 4,205,287 | 5/1980 | Shimizu et al. | 335/271 |
| 4,862,127 | 8/1989 | Lundstrom | 335/271 |

FOREIGN PATENT DOCUMENTS

| | | |
|---|---|---|
| 60-18803 | 6/1985 | Japan . |
| 64-34621 | 3/1989 | Japan . |

*Primary Examiner*—A. A. Mathews
*Attorney, Agent, or Firm*—Oliff & Berridge

[57] ABSTRACT

An armature lever is attached by an elastic adhesive to a catch located on an end of an armature shaft of an electromagnetic device of a camera, which is used to drive, for example, a shutter, stop, and/or mirror(s) of the camera. The armature lever and the catch can be attached by the elastic adhesive so that they abut each other or so that a gap exists between them. When the gap is provided, the gap can be filled with the elastic adhesive to further absorb any shock occurring when the armature lever and catch contact each other. A reset member, such as, for example, a spring that biases the armature toward the yoke also can be attached by the elastic adhesive to the armature shaft.

34 Claims, 7 Drawing Sheets

5,508,772

ELECTROMAGNETIC DEVICE FOR A CAMERA

BACKGROUND OF THE INVENTION

1. Field of the Invention

This invention is related to an electromagnetic device, and in particular to an electromagnetic device for a camera that can be used as the drive for the shutter, stop, and/or mirror of the camera.

2. Description of Related Art

Small electromagnetic devices are widely used in automatic cameras to drive shutters, stops, and mirrors.

Examples of this type of electromagnetic device for cameras are shown, for example, in Japanese Utility Registration Publication Nos. 64-34621, 61-5766, and 60-18803. Also see U.S. Pat. No. 4,205,287.

In Japanese Utility Registration Publication No. 61-5766, which corresponds to U.S. Pat. No. 4,205,287, an elastic adhesive is provided between a pivot axle and an armature or between the armature and an armature lever. In Japanese Utility Registration Publication No. 60-18803, an elastic adhesive also is provided between an armature and armature lever. None of these references provides an elastic adhesive between a catch located on an armature shaft and an armature lever or places the elastic adhesive in a gap between these two elements. These references also do not include a secondary member for application of a force to the catch.

In Japanese Utility Registration Publication No. 64-34621, a secondary member applies force to a catch. However, no elastic adhesive is used with the secondary member.

FIG. 5 shows this type of electromagnetic device for a camera, which includes a base plate 11. A yoke 13 is situated on the base plate, and includes contact surface 13a.

A coil 15 is wound on the yoke 13. Windings 15a, 15b of coil 15 are connected to a regulating circuit 17. An armature 19 is situated adjacent to yoke 13. A contact surface 19a is provided on armature 19 and is engageable with the contact surface 13a of yoke 13.

A connecting socket 19b is formed in armature 19. One end of an armature shaft 21 is inserted into and connected with socket 19b. A catch 21a is formed on the opposite end of shaft 21.

Between the armature 19 and the catch 21a is situated an armature lever 23. Armature lever 23 includes an opening 23a, which has a diameter larger than the diameter of shaft 21 extending therethrough so that armature lever 23 fits loosely on shaft 21. The armature 19 has force applied to it by a driving spring 25 so that armature 19 is biased in a direction that separates it from the yoke 13.

A socket 21b is formed in the catch 21a of the armature shaft 21. One end of a reset spring 27 is inserted into socket 21b. Spring 27 biases armature shaft 21 and armature 19 toward yoke 13 (i.e., spring 27 serves to return armature 19 to the position shown in FIGS. 5 and 6 from the position shown in FIG. 7).

The figure described above shows armature lever 23 and catch 21a at their widest gap. In the condition shown in FIG. 5, the armature 19 is pushed toward the right of the figure by end 27a of reset spring 27, and the contact surface 19a of armature 19 comes into contact with the contact surface 13a of the yoke 13.

In this state, end 25b of the driving spring 25 and end 27b of the reset spring 27 are both pressed down by the reset pin 29 and are not contacting a turned down portion 23b of the armature lever 23; therefore there is no force affecting the armature lever 23. Thus, the armature lever 23 can assume a free position between the catch 21a and the armature 19.

From this state, in which the yoke 13 is magnetized through the regulating circuit 17 so that the armature 19 adheres to the yoke 13, the reset pin 29 is moved in the clockwise direction. The result of this action is that end 25b of the driving spring 25 and end 27b of the reset spring 27 both follow the reset pin 29, rotating in the clockwise direction, and then contact the turned down portion 23b of the armature lever 23. In this way, the armature lever 23 receives the force of the driving spring 25 and of the reset spring 27 and rotates in the clockwise direction around its supporting shaft 31. When it moves the distance of the gap between the catch 21a and the armature 19, the armature lever 23 encounters the catch 21a and the condition shown in FIG. 6 results.

However, with this type of electromagnetic device, which is currently in use, there has been a problem with the contact surface 19a of the armature 19 and the contact surface 13a of the yoke rebounding and separating due to the force of impact when the armature lever 23 contacts the catch 21a, in spite of the existing attractive force generated between yoke 13 and armature 19. The resulting state is shown in FIG. 7.

When the condition shown in FIG. 7 occurs, the arm 23c of the armature lever 23 rotates the pin 33 that drives the shutter, stop, mirror, etc. in the clockwise direction, and if, for example, the pin 33 is the connecting pin for the front shroud or rear shroud, the front shroud or rear shroud will begin its movement, and the camera's components end up moving at times contrary to the camera's prescribed order of movement. This situation has been a drawback to the current electromagnetic devices for cameras.

When the camera's electromagnetic device shown in FIG. 5 is used to regulate the shutter, there is the problem of the reset spring slightly changing its position due to the force of the above-described impact, or due to vibration occurring when end 27b of the reset spring 27 encounters the turned down portion 23b of the armature lever 23, or when the armature lever 23 encounters the catch 21a of the armature shaft 21. Through this change of position, because the direction of the force occurring from the reset spring changes slightly and/or because the reset spring vibrates, there is the problem of the armature lever 23 no longer moving in a stable manner, and the shutter's timing getting thrown off when the yoke 13 is demagnetized by a signal from the regulating circuit 17 in this type of condition.

SUMMARY OF THE INVENTION

This invention offers an electromagnetic device for a camera designed to overcome the foregoing and other problems present with the prior art, and can reliably prevent the components from moving at times that are contrary to the established order of movement. Accordingly, the invention can cause the armature lever to move in a stable manner.

According to one embodiment, the electromagnetic device for a camera includes an armature lever that is connected to a catch by an elastic adhesive, preferably while maintaining a gap between the catch and the armature lever. The electromagnetic device also includes an armature and a yoke that has a coil and a contact surface and is attached to a base plate. The armature includes a contact surface that is magnetically attracted to and adheres to the contact surface of the yoke. The armature also includes a connecting socket, and an armature shaft, one end of which fits in and attaches to the connecting socket, and the other end of which is equipped with the catch. The armature lever is located between the armature and the catch. The armature lever is equipped with an opening that receives the armature shaft, and enables the armature lever to slide along the armature shaft. A force-adding component, such as a spring, biases the armature away from the yoke. A regulating circuit regulates the flow of electricity to the coil so as to change the state of magnetism of the yoke, thereby regulating the attachment of the yoke and the armature, as well as the cancellation of that attachment.

The elastic adhesive also can be inserted in the gap between the catch and the armature lever so as to connect the catch to the armature lever.

According to another embodiment, the electromagnetic device for a camera includes a reset member, such as a reset spring, that applies a force to the catch on the armature shaft and is attached thereto by the elastic adhesive. As in the first embodiment, the armature includes a connecting socket and a contact surface that magnetically adheres to the yoke contact surface. The armature also includes the armature shaft, one end of which fits in and attaches to the connecting socket, and the other end of which is equipped with the catch. The armature lever is located between the armature and the catch and includes the opening that slidably receives the armature shaft. A primary force-adding component (e.g., a spring) biases the armature away from the yoke. The reset member biases the armature toward the yoke. The elastic adhesive that attaches the reset member (i.e., the reset spring) to the armature shaft absorbs the vibration that occurs when the armature shaft and the armature lever are disengaged. A regulating circuit that regulates the flow of electricity to the coil, changes the state of magnetism of the yoke, and regulates the attachment of the yoke and the armature, as well as the cancellation of that attachment also is provided.

Because the armature lever and catch of the electromagnetic device for the camera according to the first embodiment are connected with the elastic adhesive while a gap is maintained between the armature lever and the catch, the impact resulting when the armature lever and catch collide is softened by the elastic adhesive. Additionally, when the armature lever and catch are connected with the elastic adhesive by inserting the elastic adhesive in the gap between the armature lever and the catch, the impact resulting when the armature lever and catch collide is softened (i.e., absorbed) even further.

Because the armature shaft and the reset member of the electromagnetic device according to the second embodiment are connected with elastic adhesive, the force of the impact and the vibration that occurs in the reset member are absorbed by the elastic adhesive.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

A detailed description of this invention is described hereafter, with reference to the drawings.

Figure 1:
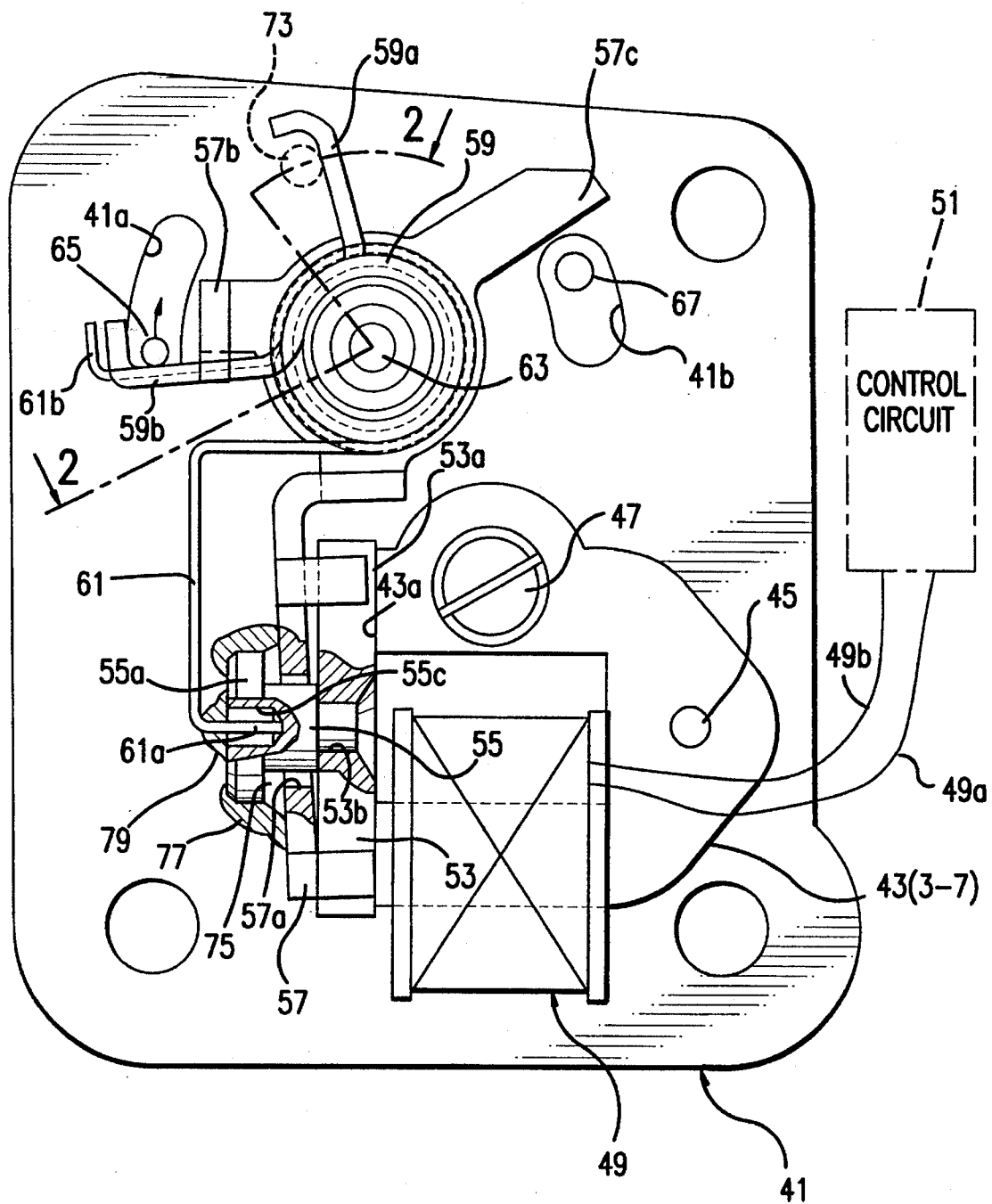
FIG. 1 is a top view of one embodiment of the electromagnetic device for a camera according to the present invention, with the armature lever spaced from the catch.

FIG. 1 shows a first embodiment of the invention, which is an electromagnetic device for a camera. The electromagnetic device includes a base plate 41. A yoke 43 is situated on base plate 41. A contact surface 43a is provided on the yoke 43. The position of the yoke 43 is determined by a position determining pin 45, and is attached to the base plate 41 by a screw 47.

A coil 49 is wound on the yoke 43. The windings 49a, 49b of coil 49 are connected to the regulating circuit 51.

An armature 53 is situated so that it adjoins yoke 43. A contact surface 53a is formed on the armature 53, and is engageable with the contact surface 43a on the yoke 43.

An engagement hole 53b is formed in the armature 53, one end of the armature shaft 55 being inserted in and affixed to the engagement hole 53b. A catch 55a is formed on the other end of the armature shaft 55.

An armature lever 57, furnished with an opening 57a, which allows the armature lever to move freely with respect to the armature shaft, is situated between the armature 53 and the catch 55a. A turned down portion 57b and an arm 57c are included on the armature lever.

Figure 5:
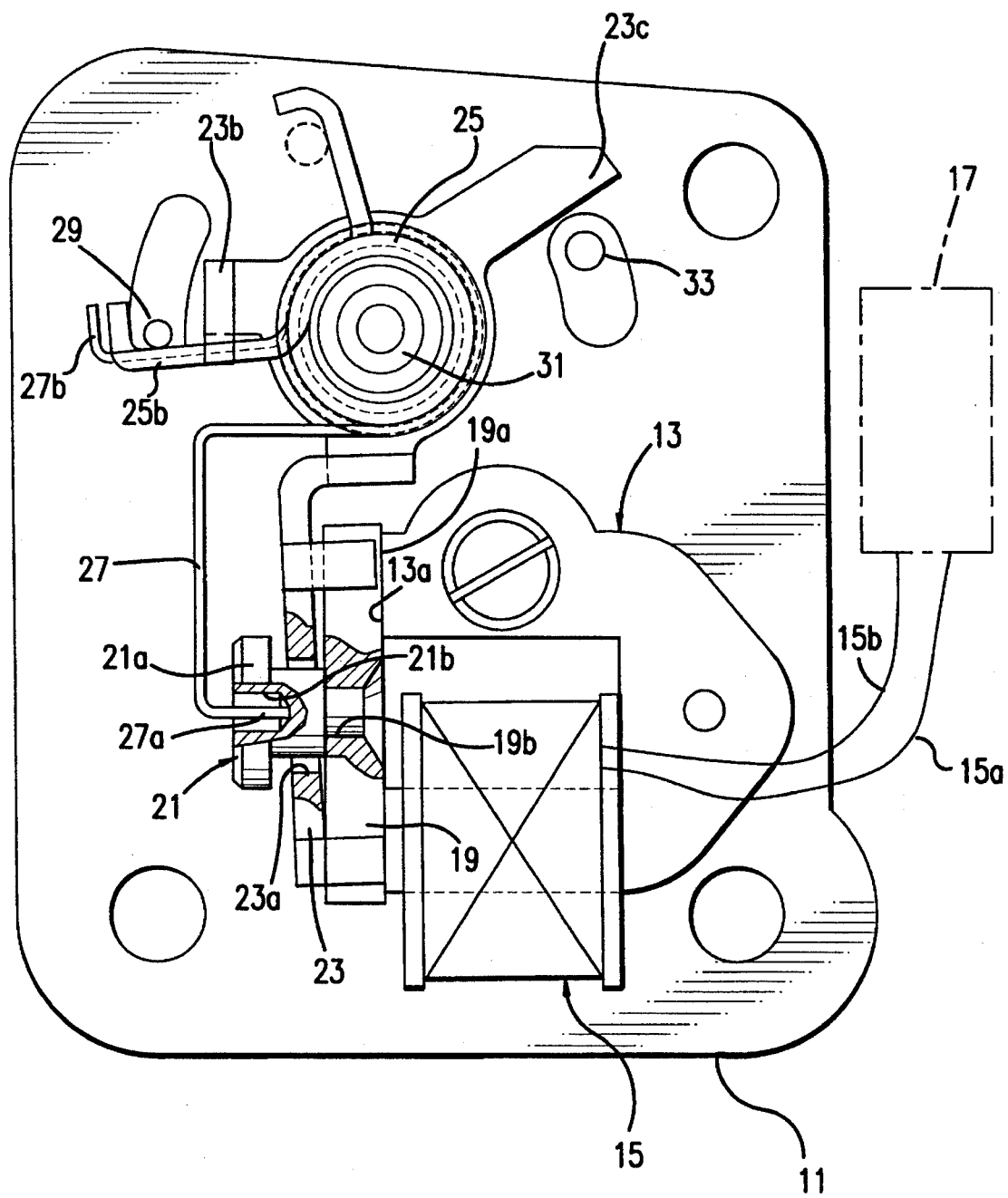
FIG. 5 is a top view of a prior art electromagnetic device for a camera.
Figure 6:
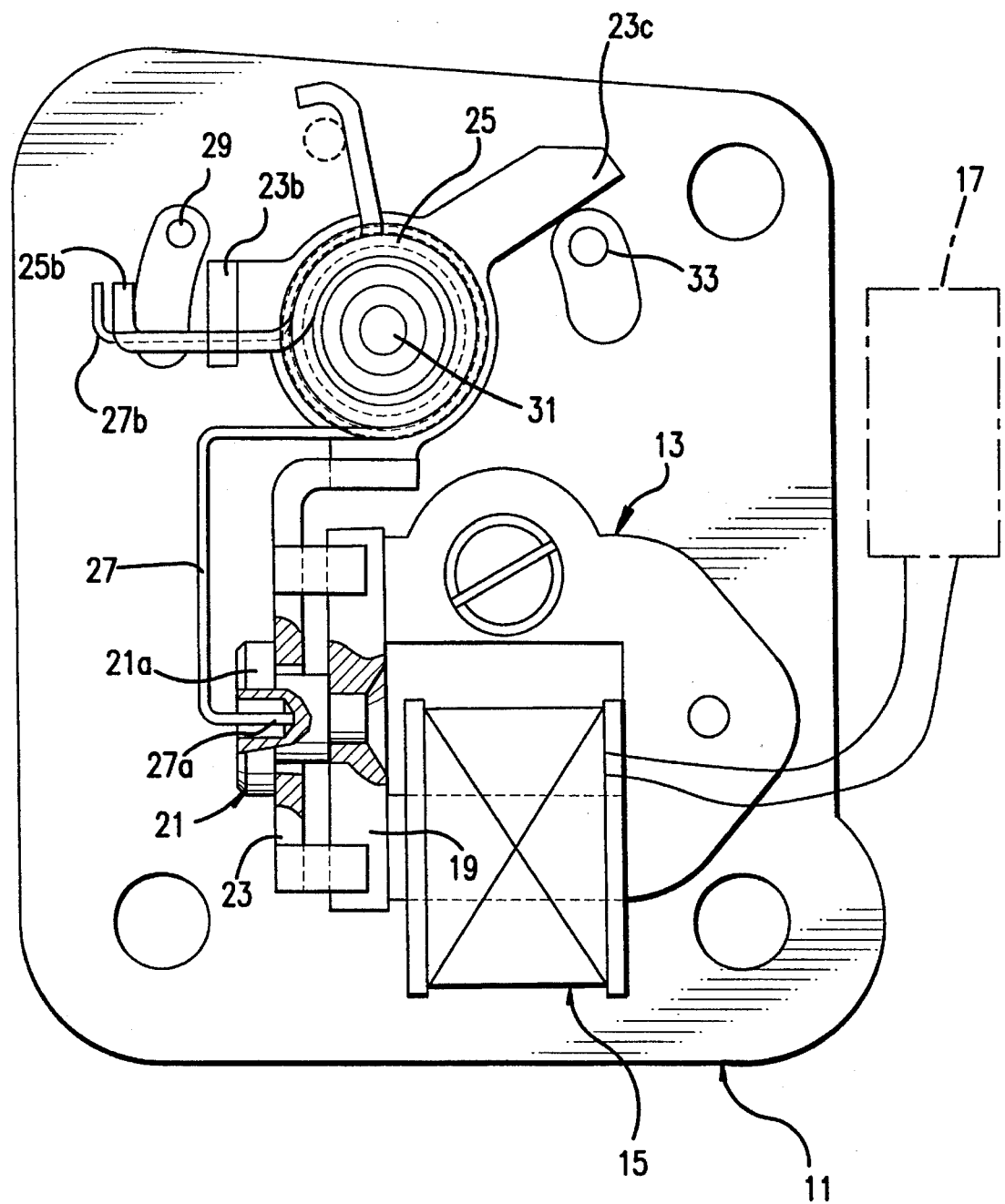
FIG. 6 is a top view of the electromagnetic device shown in FIG. 5, with the armature lever shown to be in direct contact with the catch.
Figure 7:
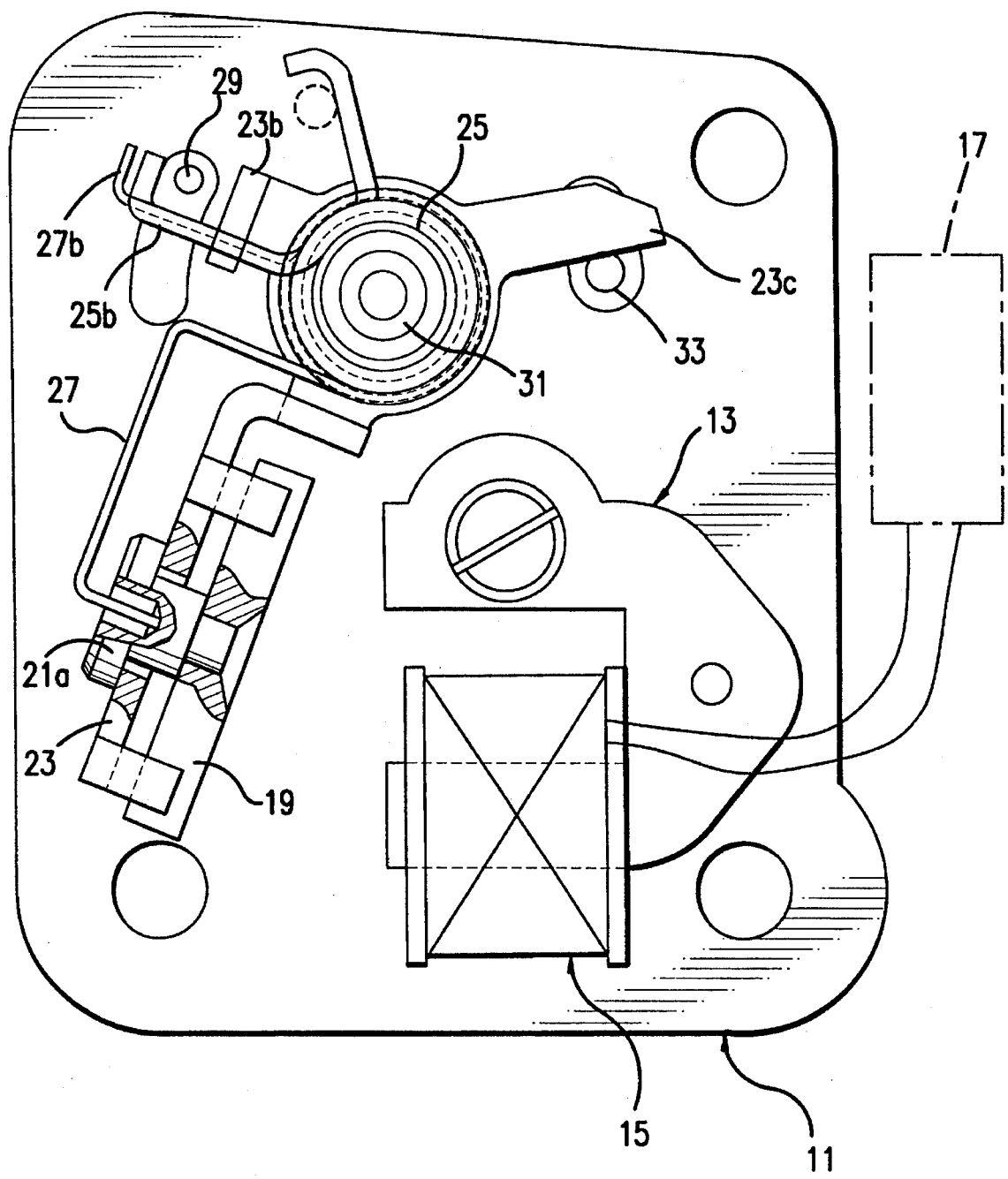
FIG. 7 is a top view of the electromagnetic device for a camera shown in FIG. 5, with its components having been driven apart.

As described with respect to FIGS. 5–7, when the end 59b of driving spring 59 contacts turned down portion 57b of armature lever 57, the armature 53 is biased by the driving spring 59 in the direction that separates it from the yoke 43. An indentation 55c is provided in the catch 55a of the armature 53, into which is inserted one end of the reset spring 61, which biases the armature shaft 55, the armature 53, and the armature lever 57 toward yoke 43. The driving spring 59 and the reset spring 61 are supported by the supporting shaft 63, which is affixed to the base plate.

Also formed into the base plate are two arc-shaped openings 41a, 41b. A reset pin 65 and a driving pin 67 extend through these arc-shaped openings.

Figure 2:
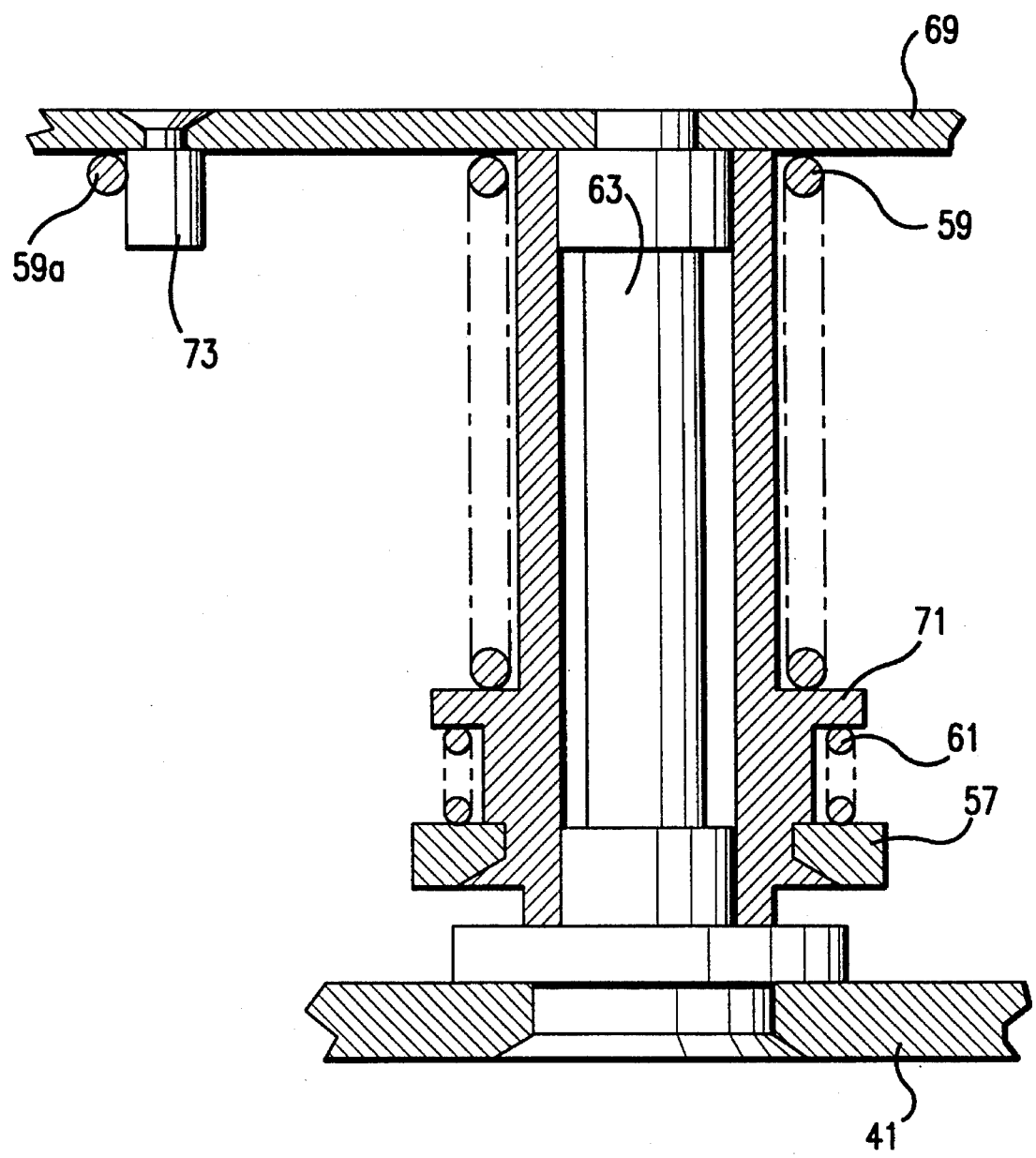
FIG. 2 is cross-sectional view through line 2—2 in FIG. 1.

FIG. 2 is a cross-sectional view through line 2—2 of FIG. 1 (through supporting shaft 63). Supporting shaft 63 is supported between the base plate 41 and a cover plate 69. The armature lever 57 is affixed to a bearing 71, which enables it to rotate around the supporting shaft 63. The driving spring 59 has one of its ends connected to pin 73, while the other end, as shown in FIG. 1, is pressed by the reset pin 65.

End 61a of the reset spring 61 touches the bottom of the indentation 55c of the armature shaft 55, while the other end 61b is pressed by the reset pin 65.

With this embodiment there is a space 75 formed between the armature lever 57 and the catch 55a, and while maintained in this spaced apart position (as shown in FIG. 1) the armature lever 57 and the catch 55a are connected with an elastic adhesive 77. Elastic adhesive 77 can be, for example, a silicone rubber adhesive.

Preferably, the armature shaft 55 and the reset spring 61 also are attached together with an elastic adhesive 79.

Furthermore, when the foregoing joining and bonding with the elastic adhesive 77, 79 is accomplished, the elastic adhesive 77, 79 also may be applied between the armature lever 57 and the catch 55a and between the armature shaft 55 and the reset spring 61. This is performed while the contact surface 53a of the armature 53 is in contact with the contact surface 43a of the yoke 43, as shown in FIG. 1, and while the armature lever 57 and the catch 55a are separated by the largest possible space (also as shown in FIG. 1). This position is maintained until the elastic adhesive 77, 79 has hardened.

The electromagnetic device for a camera constructed in the manner described above can reliably prevent the components from moving at times that are contrary to the prescribed order of movement of the camera. This goal is accomplished because the armature lever 57 and the catch 55a are joined with the elastic adhesive 77 preferably while there is a space formed between the armature lever 57 and the catch 55a, and because the elastic adhesive 77 softens (i.e., absorbs) the impact resulting when the armature lever 57 encounters the catch 55a. Thus, separation of the contact surfaces at times contrary to the prescribed order of movement will be eliminated, and a camera with a highly reliable action can be obtained.

Also, because the armature shaft 55 and the reset spring 61 have been connected by the elastic adhesive 79, the armature lever 57 can move with stability, even when the yoke 43 has been demagnetized by a signal from the regulating circuit 51. This goal is accomplished because the force of impact or vibration that develops in the reset spring 61 is absorbed by the elastic adhesive 79. That is, shock and vibration that occurs in reset spring 61 when turned down portion 57b contacts end 61b is prevented from being transmitted to armature 53 by the elastic adhesive 79. It follows that when this device is used to regulate the shutter apparatus, a shutter with a high degree of timing accuracy can be realized.

Using the above-described electromagnetic device for a camera, when the yoke 43 is magnetized and the armature 53 attaches to the yoke 43, and then the reset pin 65 begins to move in the clockwise direction, end 59b of the driving spring 59 and end 61b of the reset spring 61 follow the reset pin 65, rotating in the clockwise direction, and ultimately encounter the turned down portion 57b of the armature lever 57. However, the force of the impact and the vibration resulting in the reset spring 61 at this time are reliably absorbed by the elastic adhesive 79 that connects the armature shaft 55 and the reset spring 61.

Figure 3:
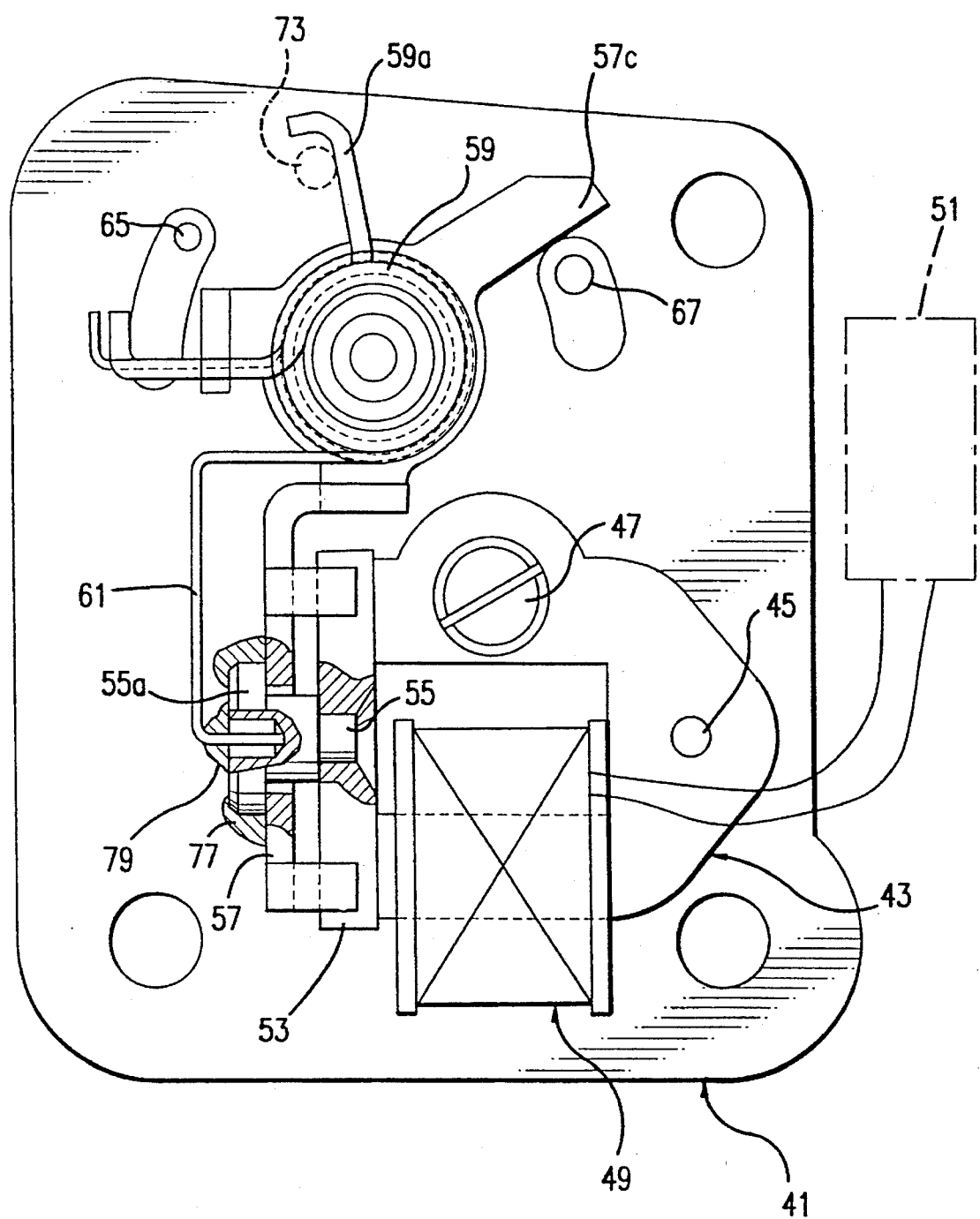
FIG. 3 is a top view of the electromagnetic device shown in FIG. 1, with the catch and the armature lever shown in direct contact.

Next, as is shown in FIG. 3, the armature lever 57 and the catch 55a collide, but, due to the elastic adhesive 77 connecting the armature lever 57 and the catch 55a, the force of impact is softened. Consequently, accidental separation of the contact surface 53a of the armature 53 and the contact surface 43a of the yoke 43 is reliably prevented.

Furthermore, as is shown in FIG. 3, if the elastic adhesive is applied to the armature lever 57 and the catch 55a while the armature lever 57 and the catch 55a are touching each other, and this position is maintained until the elastic adhesive hardens, the elastic adhesive returns to its initial position when the armature lever 57 and the catch 55a collide, and the system is simply the same as its original form, with no softening of the force of the impact occurring.

Figure 4:
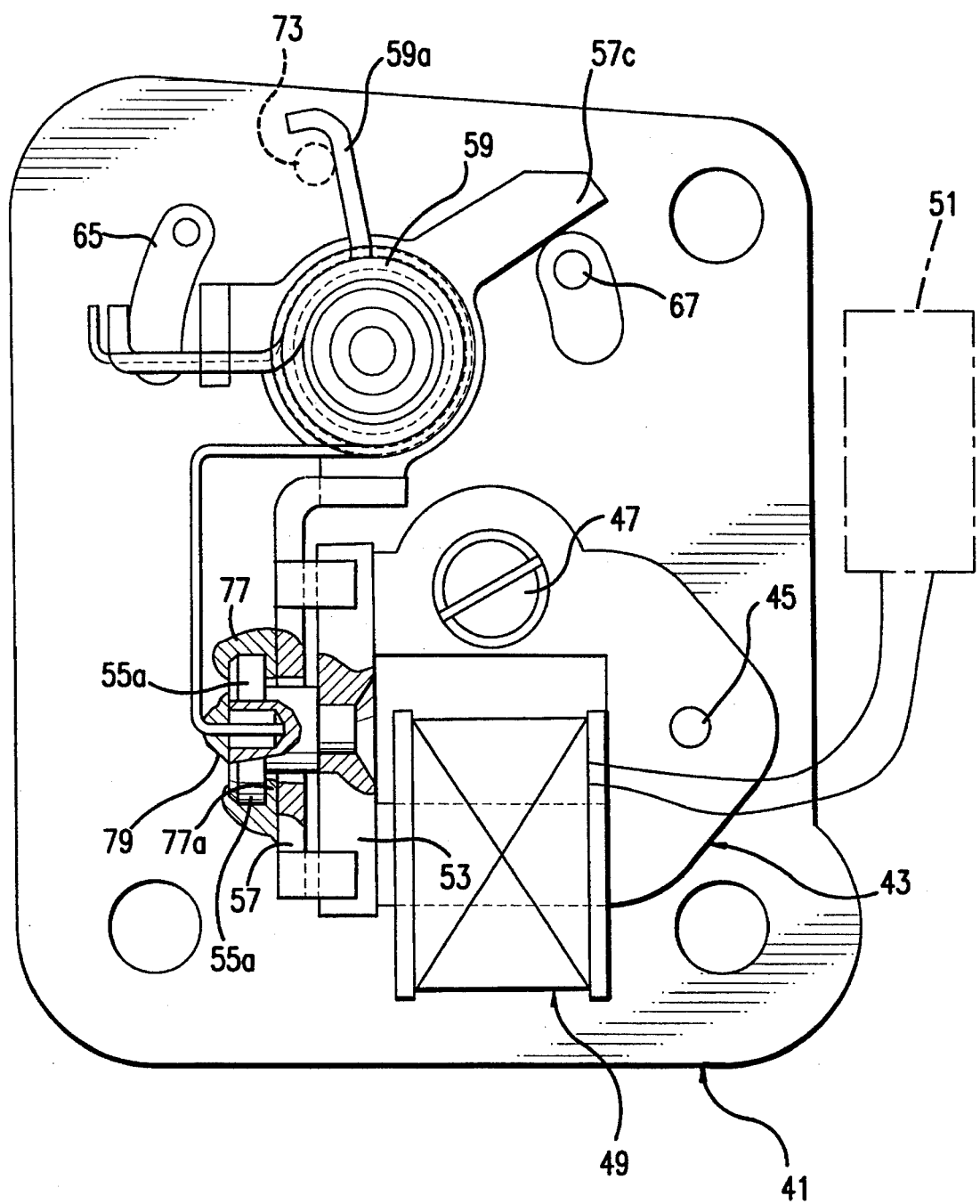
FIG. 4 is a top view of a second embodiment of the electromagnetic device for a camera, according to the present invention.

FIG. 4 shows the embodiment of the electromagnetic device for a camera in which the elastic adhesive is applied between the armature lever 57 and the catch 55a. According to this embodiment, an effect may be obtained which is virtually the same as that described with respect to FIG. 1. With this example, however, because the elastic adhesive 77a has been applied directly between the armature lever 57 and the catch 55a, it is possible for the elastic adhesive to modify and even further soften the force of the impact that results when the armature lever 57 and the catch 55a collide.

With the electromagnetic device for a camera according to the invention, because the armature lever and the catch have been joined together with an elastic adhesive while the armature lever and the catch are separated to form a space therebetween, the impact occurring when the armature lever and the catch collide is softened by the elastic adhesive. This reliably prevents the camera components from moving at times contrary to their prescribed order of movement.

Also, with the present invention, when the elastic adhesive has been inserted between the catch and the armature lever, causing them to be adhered together, the impact resulting when the armature lever and the catch collide is softened even more. This results in an even more reliable prevention of the camera components moving at times contrary to their prescribed order of movement.

Furthermore, according to the invention, because the armature shaft and the reset member are attached with elastic adhesive, the armature lever can move stably because the force of impact and vibration that develop in the reset member are absorbed by the elastic adhesive.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An electromagnetic device comprising:
   a yoke having a first contact surface, a drive coil and a drive circuit coupled to said drive coil to selectively change a magnetism of said yoke;
   an armature having a second contact surface engageable with said first contact surface of said yoke, an armature shaft, and a catch provided on a portion of said armature shaft spaced from said second contact surface;
   an armature lever slidably received on said armature shaft between said catch and said second contact surface; and
   an elastic adhesive attaching said armature lever to said catch.

2. The electromagnetic device of claim 1, wherein a gap is provided between said catch and said armature lever, said elastic adhesive maintaining said gap when no forces are applied between said catch and said armature lever.

3. The electromagnetic device of claim 2, wherein said elastic adhesive is located in said gap.

4. The electromagnetic device of claim 1, wherein said catch and said armature lever abut each other, said elastic adhesive maintaining said catch and said armature lever in abutment when no forces are applied between said catch and said armature lever.

5. The electromagnetic device of claim 1, wherein said elastic adhesive is a silicone rubber adhesive.

6. The electromagnetic device of claim 1, further comprising a reset member that applies a force to said armature to bias said armature toward said yoke, said reset member attached to said armature by said elastic adhesive so that said elastic adhesive absorbs shock that results when said armature lever contacts said catch.

7. The electromagnetic device of claim 6, wherein said reset member is a spring.

8. The electromagnetic device of claim 6, wherein said reset member is attached to said catch on a side of said catch opposite from said armature lever.

9. The electromagnetic device of claim 1, further comprising a biasing member that applies a force to said armature lever to bias said armature lever away from said yoke and toward said catch.

10. The electromagnetic device of claim 9, wherein said biasing member is a spring.

11. The electromagnetic device of claim 10, further comprising a driving pin, and wherein a first end of said armature lever is slidably received on said armature shaft, a second end of said armature lever including:
   a first portion that is engageable with said spring; and
   a second portion that is selectively engageable with said driving pin.

12. The electromagnetic device of claim 11, wherein said driving pin is coupled to a camera shutter.

13. The electromagnetic device of claim 11, wherein said driving pin is coupled to a camera stop.

14. The electromagnetic device of claim 11, wherein said driving pin is coupled to a camera mirror.

15. An electromagnetic device comprising:
   a yoke having a first contact surface, a drive coil and a drive circuit coupled to said drive coil to selectively change a magnetism of said yoke;
   an armature having a second contact surface engageable with said first contact surface of said yoke, an armature shaft, and a catch provided on a portion of said armature shaft spaced from said second contact surface;
   an armature lever slidably received on said armature shaft between said catch and said second contact surface;
   a reset member that applies a force to said armature to bias said armature toward said yoke; and
   an elastic adhesive attaching said reset member to said armature so that said elastic adhesive absorbs shock that results when said armature lever contacts said catch.

16. The electromagnetic device of claim 15, wherein said reset member is a spring.

17. The electromagnetic device of claim 15, wherein said reset member is attached to said catch on a side of said catch opposite from said armature lever.

18. The electromagnetic device of claim 15, wherein said elastic adhesive is a silicone rubber adhesive.

19. The electromagnetic device of claim 15, further comprising a biasing member that applies a force to said armature lever to bias said armature lever away from said yoke and toward said catch.

20. The electromagnetic device of claim 19, wherein said biasing member is a spring.

21. The electromagnetic device of claim 20, further comprising a driving pin, and wherein a first end of said armature lever is slidably received on said armature shaft, a second end of said armature lever including:
   a first portion that is engageable with said spring; and
   a second portion that is selectively engageable with said driving pin.

22. The electromagnetic device of claim 21, wherein said driving pin is coupled to a camera shutter.

23. The electromagnetic device of claim 21, wherein said driving pin is coupled to a camera stop.

24. The electromagnetic device of claim 21, wherein said driving pin is coupled to a camera mirror.

25. The electromagnetic device of claim 19, wherein said armature lever is attached to said catch by said elastic adhesive.

26. An electromagnetic device comprising:
   a yoke having a first contact surface, a drive coil and a drive circuit coupled to said drive coil to selectively change a magnetism of said yoke;
   an armature having: a second contact surface engageable with said first contact surface of said yoke, an armature shaft, and a catch provided on a portion of said armature shaft spaced from said second contact surface;
   an armature lever slidably received on said armature shaft between said catch and said second contact surface; and
   an elastic adhesive attaching said armature lever to said armature.

27. The electromagnetic device of claim 26, wherein said elastic adhesive is located between said armature lever and said catch.

28. The electromagnetic device of claim 26, wherein said elastic adhesive is a silicone rubber adhesive.

29. The electromagnetic device of claim 26, further comprising a biasing member that applies a force to said armature lever to bias said armature lever away from said yoke and toward said catch.

30. The electromagnetic device of claim 29, wherein said biasing member is a spring.

31. The electromagnetic device of claim 29, further comprising a driving pin, and wherein a first end of said armature lever is slidably received on said armature shaft, a second end of said armature lever including:
   a first portion that is engageable with said biasing member; and
   a second portion that is selectively engageable with said driving pin.

32. The electromagnetic device of claim 31, wherein said driving pin is coupled to a camera shutter.

33. The electromagnetic device of claim 31, wherein said driving pin is coupled to a camera stop.

34. The electromagnetic device of claim 31, wherein said driving pin is coupled to a camera mirror.

* * * * *